United States Patent
Arai

(10) Patent No.: US 10,122,229 B2
(45) Date of Patent: Nov. 6, 2018

(54) MOTOR HAVING ROTOR OF OPTIMIZED SHAPE

(71) Applicant: FANUC CORPORATION, Yamanashi (JP)

(72) Inventor: Leo Arai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 22 days.

(21) Appl. No.: 15/351,569

(22) Filed: Nov. 15, 2016

(65) Prior Publication Data

US 2017/0141630 A1     May 18, 2017

(30) Foreign Application Priority Data

Nov. 17, 2015   (JP) .................................. 2015-225181

(51) Int. Cl.
  *H02K 3/18*     (2006.01)
  *H02K 1/27*     (2006.01)
  (Continued)

(52) U.S. Cl.
  CPC ............. *H02K 1/274* (2013.01); *H02K 1/146* (2013.01); *H02K 3/18* (2013.01); *H02K 21/16* (2013.01); *H02K 2213/03* (2013.01)

(58) Field of Classification Search
  CPC .... H02K 1/274; H02K 1/2746; H02K 1/2753; H02K 1/276
  (Continued)

(56) References Cited

U.S. PATENT DOCUMENTS

| 2,449,563 A * | 9/1948 | Minorsky | ............... G01M 1/22 |
| | | | 29/407.05 |
| 2009/0267437 A1* | 10/2009 | Chai | ..................... H02K 1/278 |
| | | | 310/156.25 |

(Continued)

FOREIGN PATENT DOCUMENTS

| JP | 200614457 A | 1/2006 |
| JP | 2006311738 A | 11/2006 |

(Continued)

OTHER PUBLICATIONS

English Abstract and Machine Translation for Japanese Publication No. 2014-150626 A, published Aug. 21, 2014, 19 pgs.

(Continued)

*Primary Examiner* — Terrance Kenerly
(74) *Attorney, Agent, or Firm* — Fredrikson & Byron, P.A.

(57) ABSTRACT

A motor according to an embodiment of the present invention includes a rotor having a rotor core and a plurality of magnetic poles including permanent magnets provided in the rotor core; and a stator having a stator core in which a plurality of teeth disposed on the side of the outer periphery of the rotor so as to be opposed to the plurality of magnetic poles and slots for containing armature winding wound around the plurality of teeth are formed. The rotor is structured such that the distance r(θ) between the center of the rotor and the outer periphery thereof satisfies the following equations (1) and (2):

$$\int_{-\phi}^{\phi} |f(\theta)^2 - r(\theta)^2| d\theta \leq \frac{\phi(R^2 - r_0^2)}{10} \quad (1)$$

(Continued)

-continued $$\int_{-\phi}^{\phi} |r_1(\theta)^2 - r(\theta)^2| d\theta > 0 \qquad (2)$$

15 Claims, 11 Drawing Sheets

(51) Int. Cl.
  *H02K 1/14* (2006.01)
  *H02K 21/16* (2006.01)
(58) Field of Classification Search
  USPC ........................................ 310/156.11, 156.46
  See application file for complete search history.

(56) References Cited

U.S. PATENT DOCUMENTS

2011/0043070 A1  2/2011 Evans et al.
2011/0050022 A1* 3/2011 Li ..................... H02K 1/276
                                                310/156.46
2011/0260466 A1* 10/2011 Hori .................. H02K 1/276
                                                  290/1 B

FOREIGN PATENT DOCUMENTS

JP        200829078 A    2/2008
JP        2014150626 A   8/2014

OTHER PUBLICATIONS

English Abstract for Japanese Publication No. 2008029078 A, published Feb. 7, 2008, 1 pg.
English Abstract for Japanese Publication No. 2006311738 A, published Nov. 9, 2006, 1 pg.
English Abstract for Japanese Publication No. 2006014457 A, published Jan. 12, 2006, 1 pg.
Untranslated Decision to Grant mailed by Japan Patent Office (JPO) for Application No. JP 2015-225181, Sep. 15, 2017, 3 pages.
English machine translation Decision to Grant mailed by Japan Patent Office (JPO) for Application No. JP 2015-225181, Sep. 15, 2017, 3 pages.

* cited by examiner

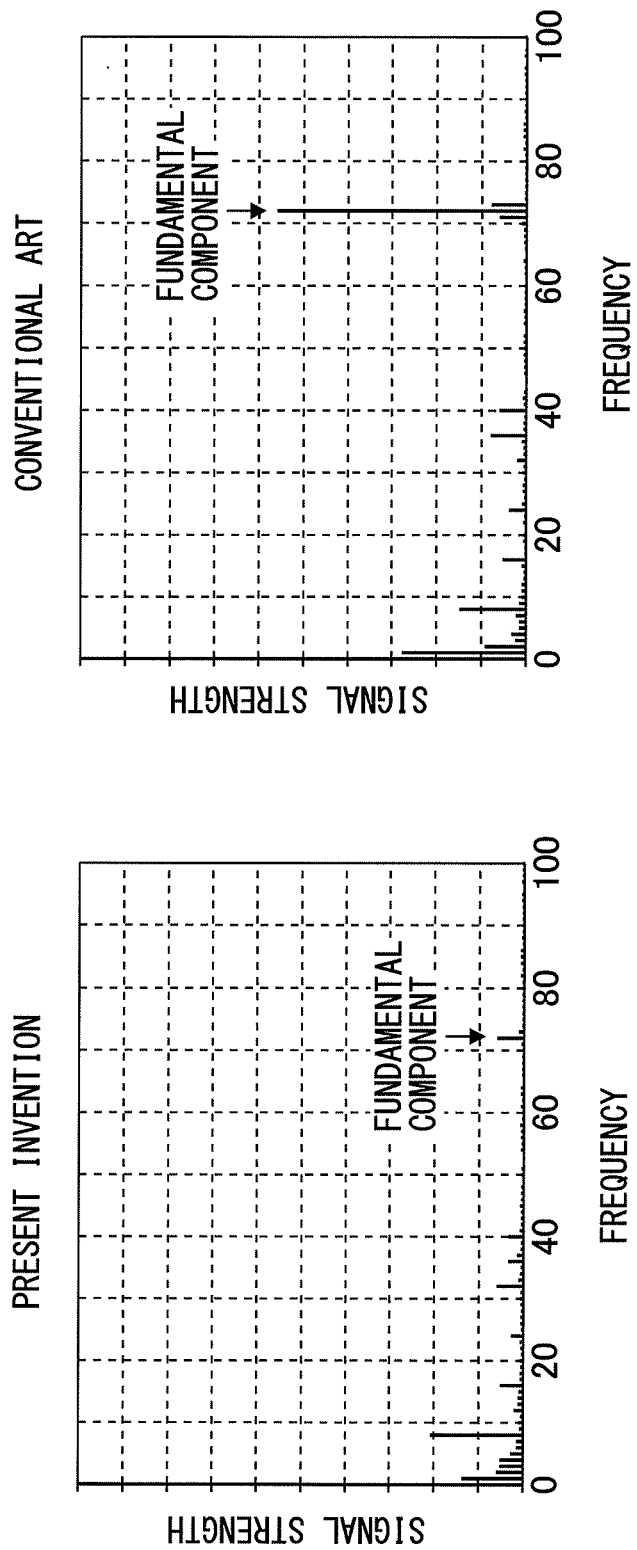

MOTOR HAVING ROTOR OF OPTIMIZED SHAPE

BACKGROUND OF THE INVENTION

1. Field of the Invention

The present invention relates to a motor, and specifically relates to a motor having a rotor of optimized shape.

2. Description of Related Art

It is generally known that the fundamental frequency component (hereinafter referred to as "fundamental component") of a cogging torque per rotation of a rotor, which can be reduced by optimizing the shape of the rotor, appears at a frequency of the least common multiple of the number of poles of the rotor and the number of teeth of a stator.

To reduce the fundamental component of a cogging torque, rotors have been conventionally optimized in shape in various ways. FIG. 1 shows a variation in the waveform (fundamental component) of a cogging torque, when a rotor is continuously varied in shape. Assuming that, when the rotor is gradually varied in shape from (1) to (5), the cogging torque has the lowest amplitude in the shape of (3). In this case, the shape of (3) is used as an optimal shape.

Conventional shape optimization aims at reducing a fundamental component, but cannot completely eliminate the fundamental component. To eliminate the remaining fundamental component, in general, the shape of a rotor, the shape of teeth of a stator, the phase relationship between the rotor and the teeth, or the like is varied in the direction of a motor axis. As the most general method of them all, a skew structure in which the polar phase of a rotor is varied in an axial direction is known (for example, Japanese Unexamined Patent Publication (Kokai) No. 2014-150626, hereinafter referred to as "patent document 1").

FIG. 2 is a schematic perspective view of a rotor having a two-layer skew structure in a conventional motor according to the patent document 1. A rotor 1002 has rotor core blocks 1041a and 1041b in two layers in an axial direction. In each of the rotor core blocks 1041a and 1041b, permanent magnets 1050 are embedded to form a plurality of magnetic poles. The rotor 1002 has a layered skew structure in which the rotor core blocks 1041a and 1041b are integrated into one unit in a state of being skewed relative to each other in a circumferential direction.

FIG. 3 is an enlarged view of an essential portion of a rotor core 1040 of FIG. 2 viewed from the axial direction in the conventional motor according to the patent document 1. A skew angle is established such that in a rotor core block 1041 including the rotor core blocks 1041a and 1041a of two layers, at least part of flux barriers 1060a and 1060b between adjacent magnetic poles overlap in space on both sides of the magnets 1050 fitted into magnet fitting recesses 1042. At least part of the overlapping flux barriers 1060a and 1060b are aligned across the layers in the axial direction. The overlapping flux barriers 1060a and 1060b have an approximately oval shape in cross section and approximately the same outer peripheral shape. Approximately aligning the flux barriers 1060a and 1060b across the layers intercepts a short circuit flux flowing through the layers in the axial direction.

In the conventional art of FIG. 2, the rotor is formed into a plurality of layers, and the phase of the rotor is skewed relative to each layer to skew the phase relationship between the rotor and a stator. Thereby, a cogging torque occurs in different phases and cancels out owing to superposition. Besides the above, a method of skewing a stator phase, a method of varying the shape of a rotor among layers, a method of varying the shape of teeth of a stator among layers, or the like may be used.

According to the conventional art, since the fundamental component of a cogging torque is not sufficiently reduced, rotors sometimes have a skew structure (continuous skew structure or skew structure among a plurality of layers). However, the skew structure may cause a reduction in the output of motors. Also, the skew structure increases the number of components and man-hours, thus increasing costs.

SUMMARY OF THE INVENTION

The present invention aims at providing a motor in which, by optimizing the shape of a rotor, the fundamental component of a cogging torque associated with the number of poles of the rotor and the number of slots of a stator is eliminated to allow a significant reduction in the cogging torque.

A motor according to an embodiment of the present invention includes a rotor having a rotor core and a plurality of magnetic poles including permanent magnets provided in the rotor core; and a stator having a stator core in which a plurality of teeth disposed on the side of the outer periphery of the rotor so as to be opposed to the plurality of magnetic poles and slots for containing armature winding wound around the plurality of teeth are formed. The rotor is structured such that the distance $r(\theta)$ between the center of the rotor and the outer periphery thereof satisfies the following equations (1) and (2):

$$\int_{-\phi}^{\phi} |f(\theta)^2 - r(\theta)^2| d\theta \le \frac{\phi(R^2 - r_0^2)}{10} \quad (1)$$

$$\int_{-\phi}^{\phi} |r_1(\theta)^2 - r(\theta)^2| d\theta > 0 \quad (2)$$

wherein, $$f(\theta) = r_0 - \frac{R - r_0}{\cos^\alpha\left(\frac{\beta}{\mu^{r-1}}|\theta|^\gamma\right)} \quad (3)$$

$$r_1(\theta) = r_0 - \frac{R - r_0}{\cos\left(\frac{p}{2}\theta\right)} \quad (4)$$

$$\frac{3\pi}{5p} \le \phi \le \frac{\pi}{p} \quad (5)$$

$$\frac{1}{3} \le \alpha \le 2 \quad (6)$$

$$\frac{p}{4} \le \beta \le p \quad (7)$$

$$\frac{3\pi}{5p} \le \mu \le \frac{\pi}{p} \quad (8)$$

$$\frac{1}{2} \le \gamma \le 4 \quad (9)$$

R: the minimum diameter of the stator core
$r_0$: the maximum diameter of the rotor
$r_1$: the diameter of a rotor of a conventional shape
p: the number of the poles of the rotor θ: an angle [rad] with respect to a straight line (0 [rad]) that extends from the rotation center of the rotor to the center of the pole of the rotor orthogonal to a rotation axis.

φ: a specified range [rad] of r(θ)

α, β, γ, and μ: parameters each having a range specified by the above equations and characterizing the shape of the rotor.

BRIEF DESCRIPTION OF THE DRAWINGS

The objects, features, and advantages of the present invention will be more apparent from the following description of an embodiment in conjunction with the attached drawings, wherein:

FIG. 12A is a graph showing the frequency components of the cogging torque in the motor according to the embodiment of the present invention;

FIG. 12B is a graph showing the frequency components of the cogging torque in the conventional motor;

DETAILED DESCRIPTION OF THE INVENTION

Figure 1:
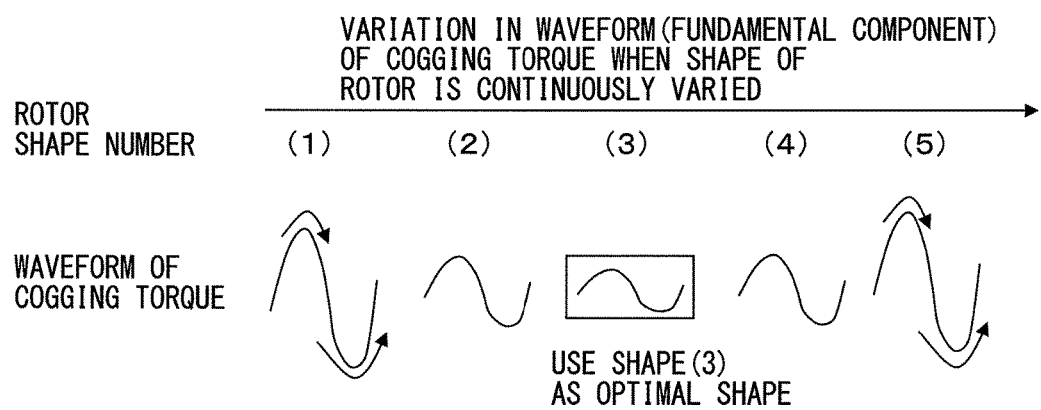
FIG. 1 is a schematic diagram showing a variation in the waveform (fundamental component) of a cogging torque, when a rotor is continuously varied in shape in a conventional motor.
Figure 2:
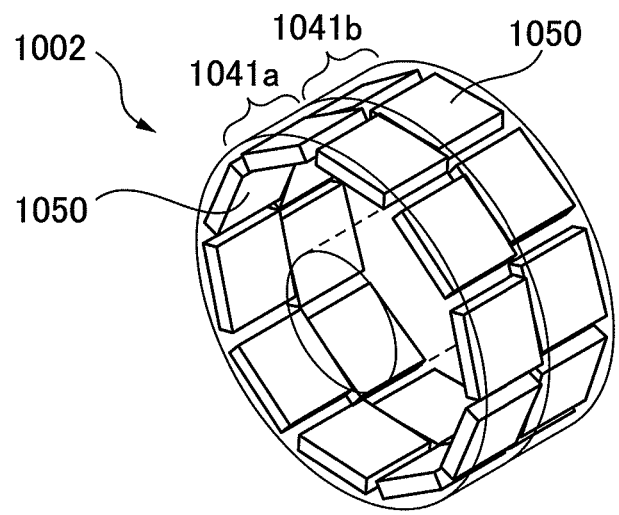
FIG. 2 is a schematic perspective view of a rotor having a two-layer skew structure in the conventional motor.
Figure 3:
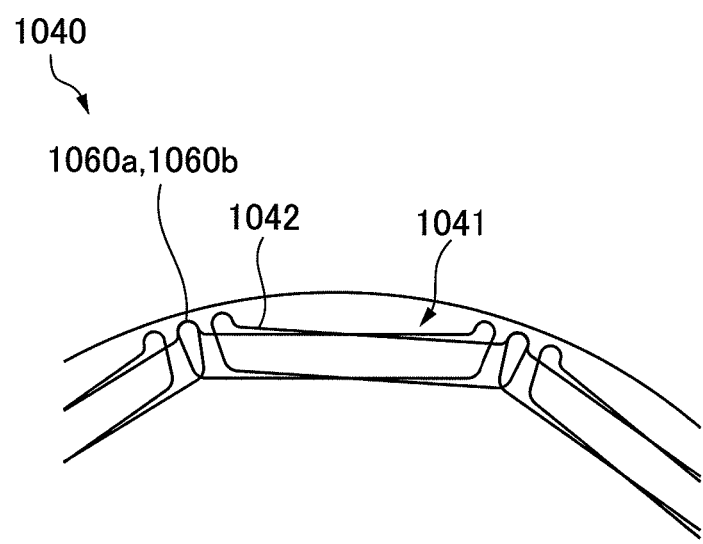
FIG. 3 is an enlarged view of an essential portion of the conventional motor shown in FIG. 2 viewed from an axial direction.
Figure 4:
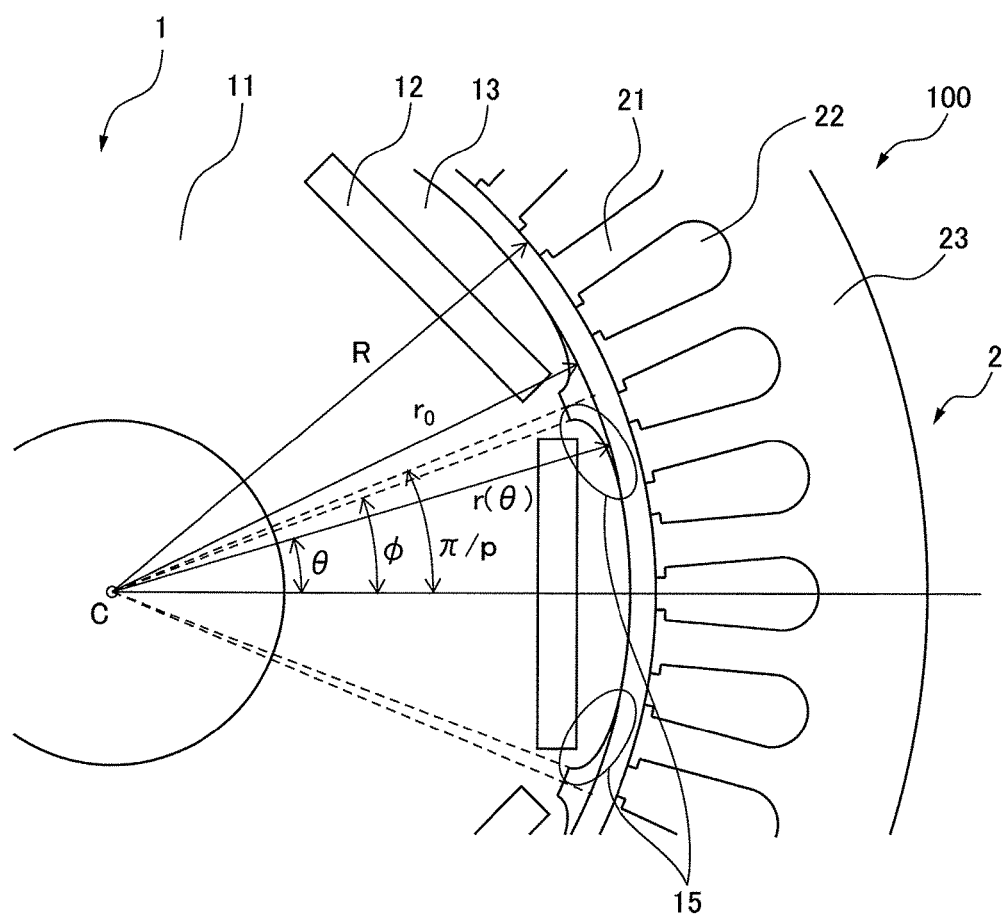
FIG. 4 is a sectional view of a motor according to an embodiment of the present invention.

A motor according to the present invention will be described below with reference to the drawings. FIG. 4 is a sectional view of the motor according to an embodiment of the present invention. A motor 100 according to the embodiment of the present invention has a rotor 1 and a stator 2. The rotor 1 has a rotor core 11 and a plurality of magnetic poles 13 including permanent magnets 12 provided in the rotor core 11. The stator 2 has a stator core 23 in which a plurality of teeth 21 and slots 22 are formed. The plurality of teeth 21 are disposed on the side of the outer periphery of the rotor 1 so as to be opposed to the plurality of magnetic poles 13. The slots 22 contain armature winding (not shown) wound around the plurality of teeth 21.

In the motor 100 according to the embodiment of the present invention, the rotor 1 is structured such that the distance r(θ) between the center C of the rotor 1 and the outer periphery of the rotor 1 satisfies the following equations (1) and (2):

$$\int_{-\phi}^{\phi} |f(\theta)^2 - r(\theta)^2| d\theta \leq \frac{\phi(R^2 - r_0^2)}{10} \quad (1)$$

$$\int_{-\phi}^{\phi} |r_1(\theta)^2 - r(\theta)^2| d\theta > 0 \quad (2)$$

where f(θ) is represented by the following equation (3):

$$f(\theta) = r_0 - \frac{R - r_0}{\cos^\alpha\left(\frac{\beta}{\mu^{\gamma-1}}|\theta|^\gamma\right)} \quad (3)$$

$$r_1(\theta) = r_0 - \frac{R - r_0}{\cos\left(\frac{p}{2}\theta\right)} \quad (4)$$

In the equations (1) to (3), φ, α, β, μ, and γ are parameters that characterize the shape of the rotor. The parameters are set so as to satisfy the following equations (5) to (9):

$$\frac{3\pi}{5p} \leq \phi \leq \frac{\pi}{p} \quad (5)$$

$$\frac{1}{3} \leq \alpha \leq 2 \quad (6)$$

$$\frac{p}{4} \leq \beta \leq p \quad (7)$$

$$\frac{3\pi}{5p} \leq \mu \leq \frac{\pi}{p} \quad (8)$$

$$\frac{1}{2} \leq \gamma \leq 4 \quad (9)$$

In the equations (1) to (3), R, $r_0$, $r_1$, p, θ, and φ are defined as follows:

R: the minimum diameter of the stator core 23

$r_0$: the maximum diameter of the rotor 1

$r_1$: the diameter of a rotor of a conventional shape p: the number of the poles of the rotor 1

θ: an angle [rad] with respect to a straight line (0 [rad]) that extends from the rotation center C of the rotor 1 to the center of the pole of the rotor 1 orthogonally to a rotation axis.

ϕ: a specified range [rad] of r(θ)

Figure 5:
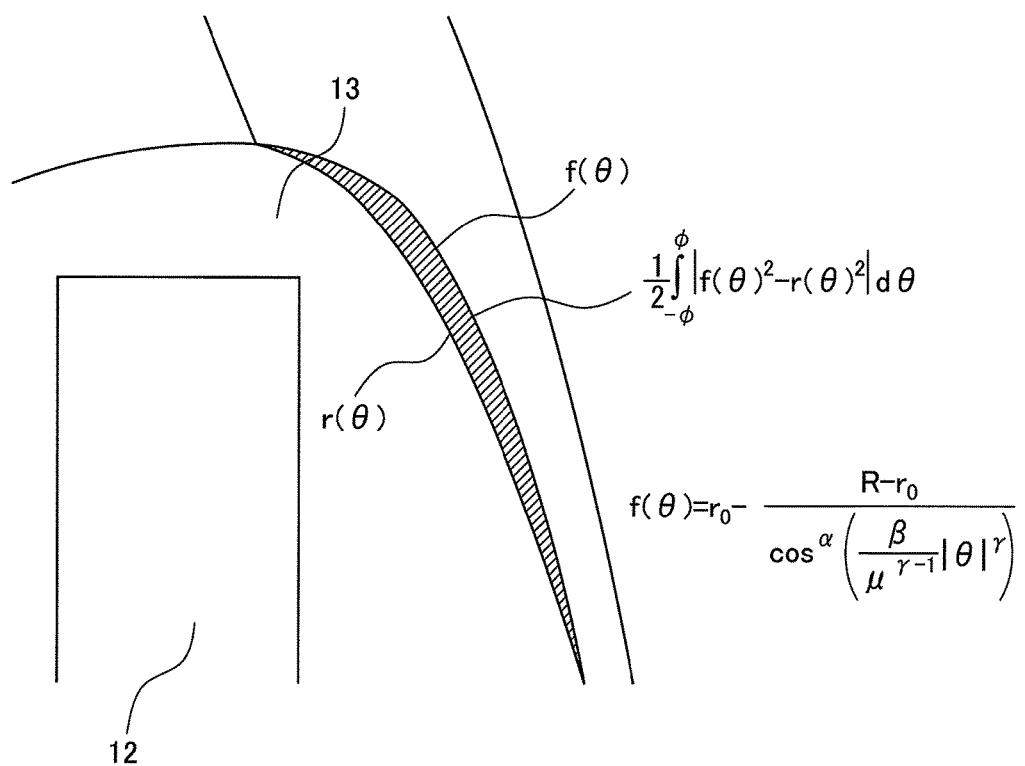
FIG. 5 is an enlarged sectional view of the periphery of a rotor in the motor according to the embodiment of the present invention.

FIG. 5 shows the relationship between f(θ) and r(θ). An area enclosed with curves f(θ) and r(θ) is represented by the following equation over a range between −ϕ and ϕ. The left side of the equation (1) is proportional to the area.

$$\frac{1}{2}\int_{-\phi}^{\phi} |f(\theta)^2 - r(\theta)^2| d\theta$$

The higher the left side of the equation (1), the larger the difference in shape between f(θ) and r(θ). On the other hand, the right side of the equation (1) is proportional to an area enclosed with the maximum diameter $r_0$ of the rotor and the minimum diameter R of the stator, that is, an area represented by the following equation:

$$\frac{2\phi(R^2 - r_0^2)}{2} = \phi(R^2 - r_0^2)$$

It is said that the equation (1) specifies "an allowance for the difference between the curves f(θ) and r(θ) in the shape of the rotor" by a ratio relative to "the area enclosed with the maximum diameter $r_0$ of the rotor and the minimum diameter R of the stator".

The adequacy of a coefficient (1/10) on the right side of the equation (1) will be additionally described. By way of example, p=8, ϕ=π/8, R=30 mm, $r_0$=29.6 mm, and the difference between the curves f(θ) and r(θ) is invariably 20 μm. Assuming that f(θ) is circular for convenience in calculation, in FIG. 5, the area enclosed with the curves f(θ) and r(θ) over the range between −ϕ and ϕ is calculated as follows:

$$\frac{1}{2}\int_{-\phi}^{\phi} |f(\theta)^2 - r(\theta)^2| d\theta$$

=½·π/8·2·(29.6^2−29.58^2)≈0.4648

The area enclosed with the maximum diameter $r_0$ of the rotor and the minimum diameter R of the stator over the range between −ϕ and ϕ is calculated as follows:

$$\frac{2\phi(R^2 - r_0^2)}{2} = \phi(R^2 - r_0^2)$$

=π/8·(30^2−29.6^2)≈9.3619

The ratio between the above two calculation results is 0.4648/90.3619=0.049648 . . . ≈1/20.

Therefore, the coefficient on the right side of the equation (1) is determined at 1/10.

$$\frac{1}{2}\int_{-\phi}^{\phi} |f(\theta)^2 - r(\theta)^2| d\theta \le \frac{1}{20}\phi(R^2 - r_0^2) \quad (1)$$

$$\int_{-\phi}^{\phi} |f(\theta)^2 - r(\theta)^2| d\theta \le \frac{\phi(R^2 - r_0^2)}{10}$$

Although f(θ) is not circular in actual fact, the assumption that f(θ) is circular is determined to be adequate to obtain an approximate value of the area enclosed with the curves f(θ) and r(θ).

When similar calculation is performed with the assumption that the difference between the curves f(θ) and r(θ) is invariably 10 μm, the following equation is determined to be adequate.

$$\int_{-\phi}^{\phi} |f(\theta)^2 - r(\theta)^2| d\theta \le \frac{\phi(R^2 - r_0^2)}{20}$$

The parameter ϕ may sometimes be set so as to satisfy the following equation (5'), instead of the equation (5).

$$\frac{4\pi}{5p} \le \phi \le \frac{\pi}{p} \quad (5')$$

The parameter α may sometimes be set so as to satisfy the following equation (6'), instead of the equation (6).

$$\frac{1}{2} \le \alpha \le \frac{3}{2} \quad (6')$$

The parameter γ may sometimes be set so as to satisfy the following equation (9'), instead of the equation (9).

$$\frac{1}{2} \le \gamma \le 2 \quad (9')$$

The parameter β may sometimes be set so as to satisfy the following equation (7'), instead of the equation (7).

$$\frac{p}{4} \le \beta \le \frac{p}{2} \quad (7')$$

The parameter ϕ may sometimes be set so as to satisfy the following equation (5"), instead of the equation (5).

$$\frac{9\pi}{10p} \le \phi \le \frac{\pi}{p} \quad (5'')$$

The parameter α may sometimes be set so as to satisfy the following equation (6"), instead of the equation (6).

$$\alpha = 1 \quad (6'')$$

The parameter γ may sometimes be set so as to satisfy the following equation (9"), instead of the equation (9).

$$\gamma = 1 \quad (9'')$$

Depending on the accuracy of a mold, the distance r(θ) may be determined so as to satisfy the following equation (1'), instead of the equation (1).

$$\int_{-\phi}^{\phi} |f(\theta)^2 - r(\theta)^2| d\theta \leq \frac{\phi(R^2 - r_0^2)}{20} \quad (1')$$

The distance r(θ) may be determined so as to satisfy the following equation (2'), instead of the equation (2). In this case, the amount of separation from $r_1$ is made clearer.

$$\int_{-\phi}^{\phi} |r_1(\theta)^2 - r(\theta)^2| d\theta \geq \frac{\phi(R^2 - r_0^2)}{50} \quad (2')$$

The distance r(θ) may be determined so as to satisfy the following equation (2''), instead of the equation (2). In this case, the amount of separation from $r_1$ is further made clearer.

$$\int_{-\phi}^{\phi} |r_1(\theta)^2 - r(\theta)^2| d\theta \geq \frac{\phi(R^2 - r_0^2)}{20} \quad (2'')$$

The distance r(θ) may be determined so as to satisfy the following equations (10) and (20), instead of the equations (1) and (2).

$$\int_{-\phi}^{\phi} |f(\theta)^2 - r(\theta)^2| d\theta \leq \frac{\phi(R^2 - r_0^2)}{20} \quad (10)$$

$$\int_{-\phi}^{\phi} |r_1(\theta)^2 - r(\theta)^2| d\theta \geq \frac{\phi(R^2 - r_0^2)}{20} \quad (20)$$

Here, the equations (2) and (4) will be briefly described. A synchronous motor is generally controlled on the precondition that a variation in flux linkage with the rotation angle of a rotor is represented by trigonometric functions. When the variation in flux linkage with the rotation angle of the rotor is out of the trigonometric functions, a torque ripple (torque ripple during energization) is increased, thus causing a deterioration of controllability. Thus, in order to make the variation in flux linkage in the form of trigonometric functions, trigonometric functions are conventionally used for designing the shape of the rotor itself (more specifically, the amount of variation in the distance between the rotor and the stator is provided with trigonometric functions). At this time, one pole of the rotor corresponds to a half period (one crest) of a trigonometric function (in the case of a p-pole motor, cos(pθ/2) is used).

In this embodiment, in order to optimize not a torque ripple but a cogging torque, the shape of the rotor is optimized by a new method of using trigonometric functions, instead of a conventional method of using trigonometric functions (to put it the other way, the fundamental component of the cogging torque cannot be minimized by the conventional method of using trigonometric functions). Therefore, the equations (2) and (4) are used, in contrast to the conventional method.

The equation (3) will be briefly described. In the equation (3), the parameters α, β, μ, and γ are added to the conventional functional equation (4), in order to increase flexibility in the outer peripheral shape of the rotor and facilitate finding out the minimum point of the cogging torque. The above parameters and the outer peripheral shape of the rotor have the following relations.

When α is less than 1, f(θ) expands outside relative to the outer peripheral shape of a rotor defined by the equation (4). When α is more than 1, f(θ) contracts inside relative to the outer peripheral shape of the rotor defined by the equation (4).

When β is less than p/2, f(θ) expands outside relative to the outer peripheral shape of the rotor defined by the equation (4). When β is more than p/2, f(θ) contracts inside relative to the outer peripheral shape of the rotor defined by the equation (4).

When γ is less than 1, in a range of θ<μ, f(θ) contracts inside relative to the outer peripheral shape of the rotor defined by the equation (4). In a range of θ>μ, f(θ) expands outside relative to the outer peripheral shape of the rotor defined by the equation (4).

When γ is more than 1, in a range of θ<μ, f(θ) expands outside relative to the outer peripheral shape of the rotor defined by the equation (4). In a range of θ>μ, f(θ) contracts inside relative to the outer peripheral shape of the rotor defined by the equation (4).

It is also to be noted that the manner of expanding the shape differs depending on the parameters. "Expanded" or "contracted" areas are mainly referred to by a reference numeral 15 (shoulder portions of the poles) in FIG. 4, and the maximum diameter of the rotor does not change.

The minimum point of the cogging torque is found out using the above characteristics and parameters including the size and positions of the magnets.

In the motor according to the embodiment of the present invention, the outer peripheral shape of the rotor is defined as shown in FIG. 4 and optimized by varying one or a plurality of parameters of the functional parameters α, β, γ, and μ, the positions of the magnets, the shape of the magnets, and the shape of magnet recesses (in the case of an IPM (interior permanent magnet) motor). This brings about different effects from those obtained by conventional optimization. The shape of the rotor in the motor according to the embodiment of the present invention includes all of the parameters described above, not only the outer peripheral shape but also all of the positions of the magnets, the shape of the magnets, and the shape of the magnet recesses.

Moreover, the shape of the rotor 1, the shape of the teeth 21 of the stator 2, and the phase relationship between the rotor 1 and the teeth 21 are preferably invariant in an axial direction, and the plurality of magnetic poles 13 of the rotor 1 preferably have the same shape. This structure eliminates the need for providing a skew or a step stagger, thus preventing a reduction in torque owing thereto.

The motor according to the embodiment of the present invention focuses on the fact that when the rotor is continuously varied in shape, the phase of the fundamental component is shifted by a half period (reversed). The fundamental component is cancelled using the shape at the time of reversing. The outer peripheral shape of the rotor is represented by trigonometric functions. The outer peripheral shape of the rotor is varied and optimized using the plurality of parameters.

Figure 6:
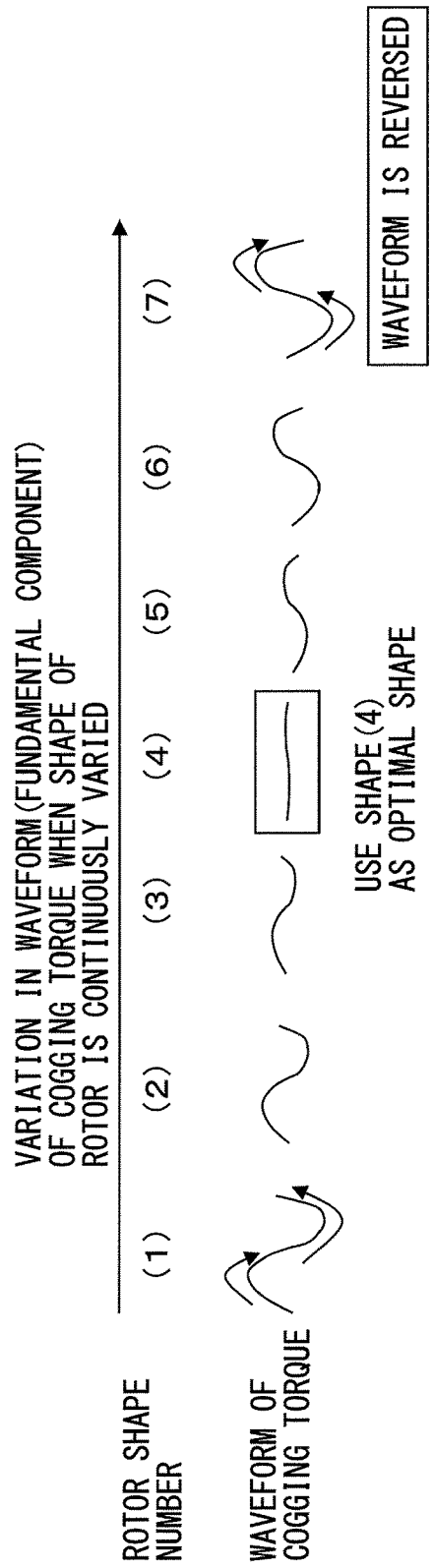
FIG. 6 is a schematic diagram showing a variation in the waveform (fundamental component) of a cogging torque, when the rotor is continuously varied in shape in the embodiment of the present invention.

FIG. 6 is a diagram showing a variation in the waveform (fundamental component) of a cogging torque, when the rotor is continuously varied in shape. In the motor according to the embodiment of the present invention, the above-described plurality of parameters (or one of them) are gradually varied as shown at rotor shape numbers (1) to (7). When the parameters are gradually varied, as shown in FIG. 6, the fundamental component of the cogging torque is varied and, when compared between (1) and (7), the phase of the fundamental component is shifted by a half period (the waveform is reversed). Therefore, there is a shape having a fundamental component of infinitesimally close to 0 in the middle between (1) and (7), for example, at (4). Thus, using the shape having a cogging torque of close to 0 (for example, the shape of (4)) allows producing a motor that has an extremely small fundamental component.

The outer peripheral shape of the rotor refers to the outer peripheral shape of magnets in surface permanent magnet (SPM) motors, while refers to the outer peripheral shape of a rotor core in interior permanent magnet (IPM) motors. The shape of a magnetic substance (the shape of a substance that has an effect on a cogging torque) is primarily kept in mind, though the shapes of a non-magnetic substance and the like (the shape of a substance that has no effect on a cogging torque, such as a resin cover and a thin SUS cover) are not kept in mind.

The equation (4) is a function that is conventionally used for designing the outer shape of a rotor, and is a general method of using trigonometric functions. The equation (2) clearly specifies a different shape from the equation (4). For the sake of more accurate optimization, the outer peripheral shape is intentionally deviated from general trigonometric functions using the various parameters, as represented by the equation (3).

To make the difference between the outer peripheral shape and the conventional shape outstand, a value is substituted into the right side of the equation (2), as follows:

$$\int_{-\phi}^{\phi} |r_1(\theta)^2 - r(\theta)^2| d\theta \geq \frac{\phi(R^2 - r_0^2)}{100} \quad (9)$$

$$\int_{-\phi}^{\phi} |r_1(\theta)^2 - r(\theta)^2| d\theta \geq \frac{\phi(R^2 - r_0^2)}{10} \quad (10)$$

The shape represented by $r(\theta)$, which contributes to a torque, differs more from a conventional shape $r_1$ in the equation (10) than in the equation (9).

Figure 7:
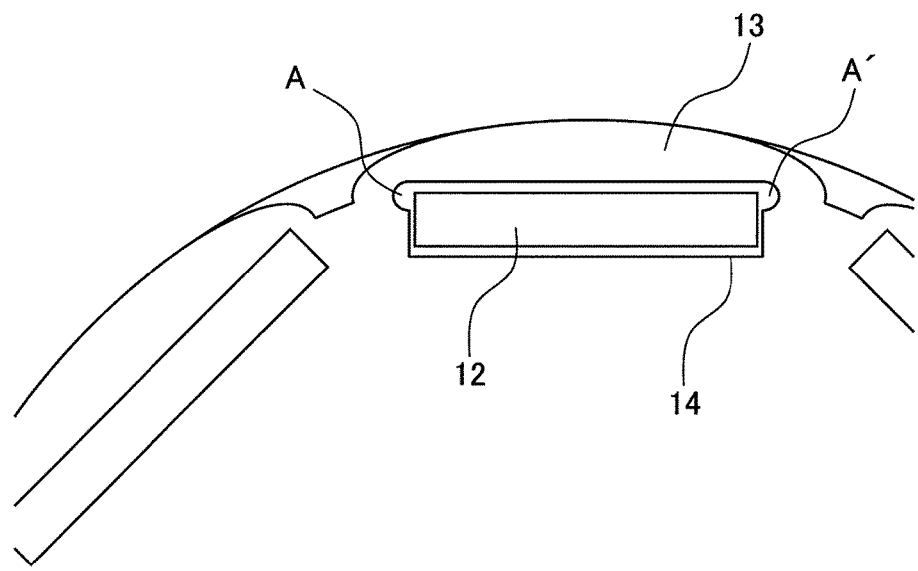
FIG. 7 is an enlarged sectional view of a magnet and a magnet recess in the motor according to the embodiment of the present invention.

FIG. 7 is an enlarged sectional view of a magnet and a magnet recess in the motor according to the embodiment of the present invention. As shown in FIG. 7, the shape of a magnet recess 14 may not be a simple recess for containing the magnet 12 but have projections that are different from the shape of the magnet 12 itself, as indicated by A and A' in FIG. 7.

Figure 8:
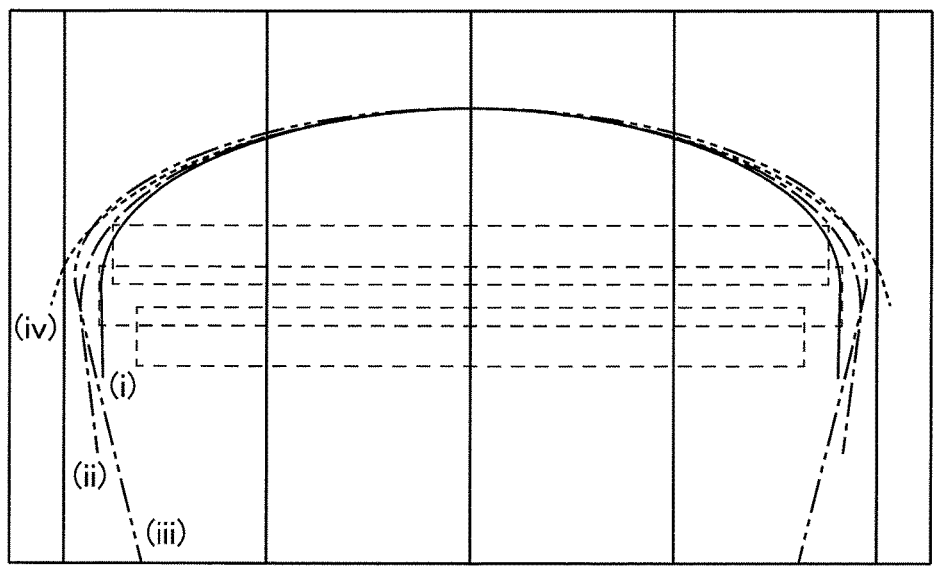
FIG. 8 shows simulation results of the shape of the rotor, when parameters are changed, in the motor according to the embodiment of the present invention.

Next, examples of the outer peripheral shape of the rotor and advantages thereof will be described. FIG. 8 shows simulation results of the shape of the rotor with changes in the parameters in the motor according to the embodiment of the present invention.

In FIG. 8, a curve (i) is a plot of the following equation (4), which is conventionally used for designing the shape of the rotor.

$$r_1(\theta) = r_0 - \frac{R - r_0}{\cos\left(\frac{p}{2}\theta\right)} \quad (4)$$

Curves (ii) to (iv) represent the outer peripheral shapes of the rotor, when the various parameters of the equation (3) are set as follows:
(ii) $\alpha=1$, $\gamma=1$, $\beta=3.8$, $\mu=1$
(iii) $\alpha=1$, $\gamma=1.7$, $\beta=7.5$, $\mu=1$
(iv) $\alpha=1$, $\gamma=1$, $\beta=3.5$, $\mu=1$ In FIG. 8, rectangles shown by dotted lines represent examples of the disposition of the magnet recess.

It is found out that the outer peripheral shapes of the rotor in the cases of (ii) to (iv) have a higher degree of flexibility in the size of the magnet and the position of the magnet recess than the outer peripheral shape of the rotor in the case of (i). Thus, it is possible to prevent a reduction in a rated output owing to the optimization of the shape of the rotor. The higher degree of flexibility in the positions of the magnet recesses facilitates fine adjustment of the positions and shape of the magnet recesses, thus serving to minimize the cogging torque.

Figure 9:
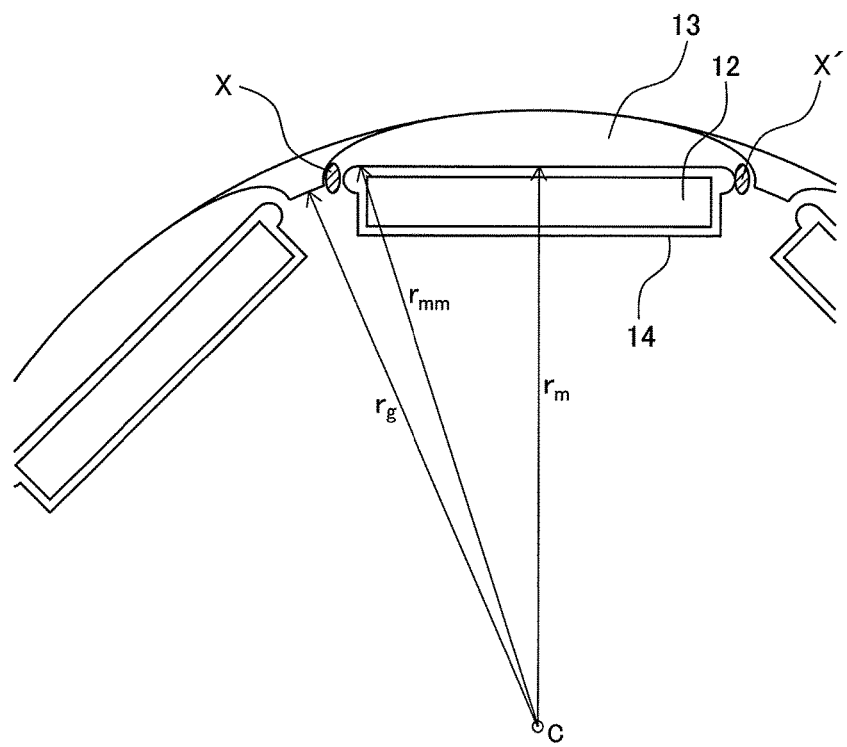
FIG. 9 is an enlarged sectional view of the magnet recess showing the distance between the center of the rotor and the edge of the magnet recess in the motor according to the embodiment of the present invention.

FIG. 9 is an enlarged sectional view of the magnet recess showing the distance between the center of the rotor and the edge of the magnet recess in the motor according to the embodiment of the present invention. In FIG. 9, $r_m$ is the distance between the center C of the rotor and the midpoint of the outer edge of the magnet recess, $r_{mm}$ is the maximum value of the distance between the center C of the rotor and the outer edge of the magnet recess in the vicinity of an interpolar portion, and $r_g$ is the distance between the center C of the rotor and the center of the interpolar portion.

In this embodiment, $r_{mm} > r_g$ basically stands true. Thus, by narrowing the distance between the magnet recess and the outer periphery of the rotor core, magnetic saturation occurs in areas X and X' in FIG. 9, thus resulting in an increase in a flux linkage owing to the magnet. At the same time, the cogging torque is optimized using the various parameters. As necessary, the cogging torque may be optimized using $r_g$ as another parameter. In this case, irrespective of $r_{mm} > r_g$, $r_g$ may be increased and, for example, a magnetic saturation portion may be formed from an interpolar straight portion and the magnet recess to optimize the cogging torque.

Next, the continuity of a variation in the shape of the rotor and the continuity of the waveform of the cogging torque will be described. As a matter of course, even if the rotor and the teeth of the stator have any shape (the outer peripheral shape, the positions of the magnets, and the like), continuity is insured between different shapes. In other words, the rotor can be changed to a completely different shape by a gradual variation in shape.

It is conceivable that, with the gradual variation in shape, the waveform of the cogging torque is continuously varied, and it actually is. There is no singular point in the continuous variation in shape in a sensible range. If the cogging torque is reversed between different shapes of the rotor, it is assumed due to the continuity that there is a shape having no cogging torque between the shapes.

Note that, the "sensible range" described here refers to a range in which the magnet does not contact the magnet next thereto or the outer periphery of the rotor does not contact the stator, in other words, a range in which a close surface constituting the rotor does not make contact during a variation in shape.

Figure 10:
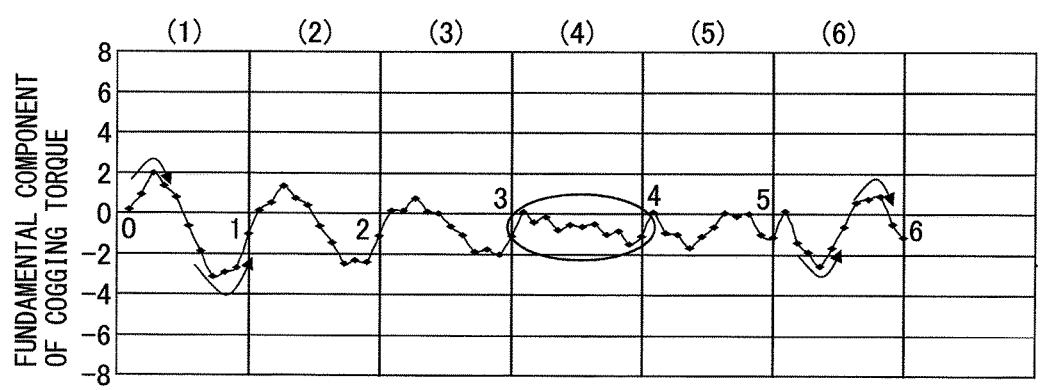
FIG. 10 shows a simulation result of a variation in the waveform of the fundamental component of a cogging torque, when the rotor is continuously varied in shape in the motor according to the embodiment of the present invention.

FIG. 10 shows a simulation result of a cogging torque with a gradual and continuous variation in the shape of the rotor from (1) to (6) in an 8 pole 36 slot motor (the number of poles is 8, and the number of slots is 36). In each shape, a simulation is performed by a 1/72 turn (5 degrees). That is to say, since the fundamental frequency component of the cogging torque produced by the 8 pole 36 slot motor appears at a frequency of 72, the simulation is performed for one period.

Comparing the simulation result at (1) and (6) in FIG. 10, a phase is shifted by a half period (a waveform is reversed). At (4) between (1) and (6), a wave of the fundamental frequency component is approximately 0. A waveform of (1) to (6) is gradually and continuously varied.

Figure 11B:
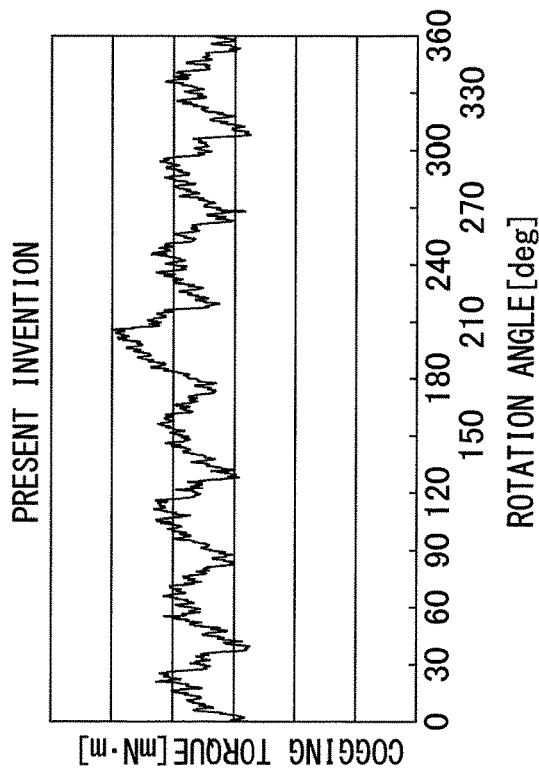
FIG. 11B is a graph showing the dependence of a cogging torque on a rotation angle in the conventional motor.
Figure 11A:
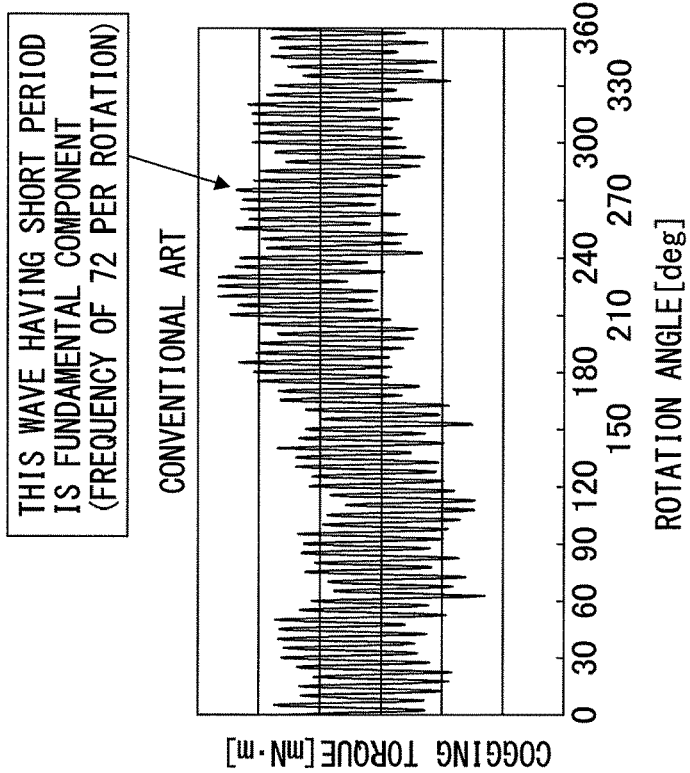
FIG. 11A is a graph showing the dependence of a cogging torque on a rotation angle in the motor according to the embodiment of the present invention.

Next, results of a comparison between a motor according to the present invention and a motor optimized according to the conventional art, which are actually manufactured, will be described. FIGS. 11A and 11B show measurement results of a cogging torque in the motors optimized according to the present invention and according to the conventional art, respectively, for the purpose of comparison. FIGS. 12A and 12B show the frequency components of the cogging torque in the motors optimized according to the present invention and according to the conventional art, respectively, for the purpose of comparison.

It is apparent from FIGS. 11A, 11B, 12A, and 12B that the motor optimized according to the present invention has a much lower fundamental component (this motor has a frequency of 72 per rotation) of the cogging torque than the motor optimized according to the conventional art.

In a cogging torque per rotation of a rotor, it should be considered that, even if the amplitude of the cogging torque of a frequency component at a frequency of the least common multiple of the number of poles of the rotor and the number of teeth of a stator is optimized (by shape optimization), the cogging torque possibly remains in the order of 0.125% of a rated torque, at the least. When a motor is actually manufactured, each of magnets, the stator, and the rotor are required to have a dimensional tolerance in shape. Also, the Br (magnetic flux density) of the magnets is required to have a tolerance. Thus, even if the fundamental component of a cogging torque is completely cancelled in a simulation, the actual motor has accuracy limitations and a small fundamental component of the cogging torque remaining. Since a plot is not a perfectly flat straight line even in the simulation, and a calculation error in the simulation has to be taken in account, it is appropriate to think that the actual motor has a slight fundamental component remaining, even if an ideal shape is intended to be chosen.

Thus, the fundamental component remains as follows:

The fundamental component contained in the shape itself (including a simulation error): 0.025%

Influence by the positions and shape tolerance of the magnets: 0.025%

Influence by the shape tolerance of the rotor core: 0.025%

Influence by the shape tolerance of the teeth of the stator: 0.025%

Influence by the tolerance of the Br of the magnets: 0.025%

The above fundamental components sum to 0.125%.

The above are values under relatively advanced technical management. In the case of processing or a choice of the magnets requiring a low cost, a quick delivery, or the like, a larger fundamental component (for example, 0.2%) possibly remains, even after the shape optimization, depending on circumstances.

Figure 13B:
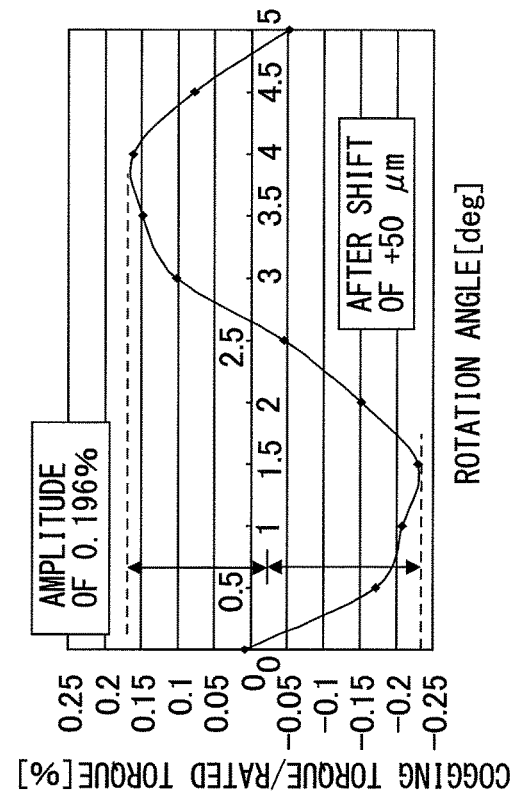
FIG. 13B is a graph showing a variation in the waveform of the fundamental component of the cogging torque, after shifting the positions of the magnets by 50 μm, in the motor according to the embodiment of the present invention.
Figure 13A:
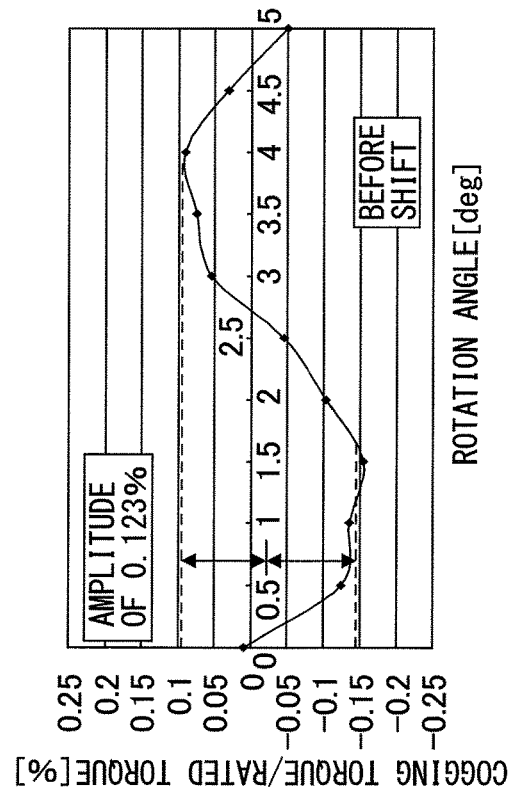
FIG. 13A is a graph showing a variation in the waveform of the fundamental component of the cogging torque, before shifting the positions of magnets by 50 μm, in the motor according to the embodiment of the present invention.

FIGS. 13A and 13B show variations (simulation results) in the waveform of the fundamental component of a cogging torque, before and after shifting the positions of magnets of a rotor (of an IPM motor) by 50 μm, respectively. By shifting the magnets by 50 μm, an amplitude ((maximum value-minimum value)/2) is increased by 0.073% from 0.123% to 0.196%. This corresponds to 0.0146% per 10 μm by simple calculation. Considering a processing technique and a yield rate, since a tolerance of the order of ±10 to 20 μm is appropriately used at the least, so that it should be considered that the cogging torque varies in the order of 0.0146 to 0.0292%. Thus, the above estimation value of 0.025% owing to the positions and shapes of the magnets is considered to be appropriate (not too large).

The shape of the rotor and the shape of the teeth of the stator have a high degree of flexibility within the tolerance, and seem to have more influence on the cogging torque than the positions of the magnets in the IPM motor. However, in the estimation that a variation of 0.025% is required at the least, a value of 0.025%, which is equal to the value associated with the positions of the magnets, is used.

Figure 14:
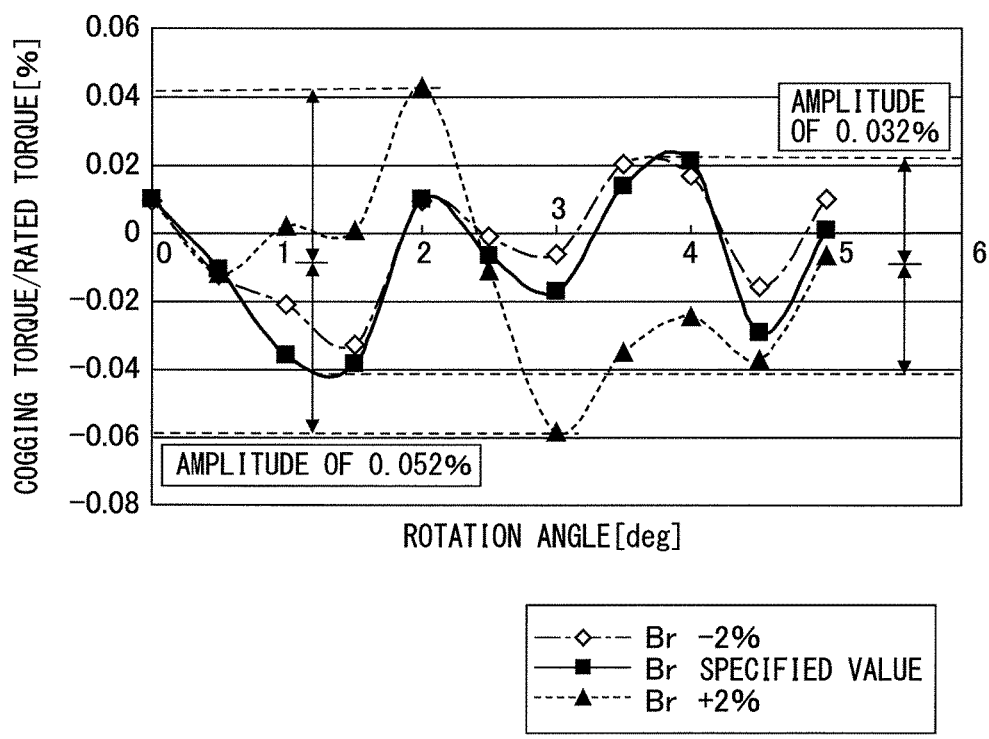
FIG. 14 is a graph showing variations in the waveforms of the fundamental component of the cogging torque, when the magnetic flux density Br of the magnets is changed in the motor according to the embodiment of the present invention.

FIG. 14 shows variations in the waveforms of the fundamental component of a cogging torque, when the magnetic flux density Br of the magnets is changed by ±2%. When the magnetic flux density Br of the magnets is shifted from a specified value by +2%, the amplitude ((maximum value-minimum value)/2) of the cogging torque deteriorates by approximately 0.02%. Since industrially marketed magnets often have a Br tolerance of ±2 to ±3%, the above estimation value of 0.025% is appropriate.

In conventional shape optimization, the shape of a rotor is sometimes varied or the phase of the rotor is sometimes varied (with a skew, a layered skew, or the like) in an axial direction of the rotor, in order to cancel the fundamental component of a cogging torque. In such an instance, the complicated structure causes an increase in costs, a reduction in output, and the like.

According to the present invention, a rotor is formed in an unconventional shape that serves to reduce the fundamental component of a cogging torque, thus allowing a reduction of the cogging torque.

When the shape optimization is insufficient, the fundamental component is not completely canceled in most cases, even if the rotor is optimally skewed (specifically not in the case of a continuous skew structure but in the case of a layered skew structure). Therefore, by the optimization of the cogging torque, even if the fundamental component slightly occurs owing to a processing tolerance, an assembly error, and the like, the provision of a skew structure can substantially completely cancel the fundamental component of the cogging torque.

According to the motor of the embodiment of the present invention, by optimizing the shape of the rotor, the fundamental component of the cogging torque associated with the number of the poles of the rotor and the number of the slots of the stator is eliminated, thus allowing a significant reduction in the cogging torque.

What is claimed is:

1. A motor comprising:
   a rotor having a rotor core and a plurality of magnetic poles including permanent magnets provided in the rotor core; and
   a stator having a stator core in which a plurality of teeth disposed on the side of the outer periphery of the rotor so as to be opposed to the plurality of magnetic poles and slots for containing armature winding wound around the plurality of teeth are formed, wherein
   the rotor has an outer peripheral surface, the outer peripheral surface having a curved shape with shape parameters, $\alpha$, $\beta$, $\gamma$, and $\mu$ as set forth below, such that a distance $r(\theta)$ between the center of the rotor and the outer peripheral surface is related to a first function $f(\theta)$ describing a first arcuate shape, and a second function $r_1(\theta)$ describing a second arcuate shape by the following equations (1) and (2):

$$\int_{-\phi}^{\phi} |f(\theta)^2 - r(\theta)^2| d\theta \le \frac{\phi(R^2 - r_0^2)}{10} \quad (1)$$

$$\int_{-\phi}^{\phi} |r_1(\theta)^2 - r(\theta)^2| d\theta > 0 \quad (2)$$

wherein, $$f(\theta) = r_0 - \frac{R - r_0}{\cos^\alpha\left(\frac{\beta}{\mu^{\gamma-1}} |\theta|^\gamma\right)} \quad (3)$$

$$r_1(\theta) = r_0 - \frac{R - r_0}{\cos\left(\frac{p}{2}\theta\right)} \quad (4)$$

$$\frac{3\pi}{5p} \le \phi \le \frac{\pi}{p} \quad (5)$$

$$\frac{1}{3} \le \alpha \le 2 \quad (6)$$

$$\frac{p}{4} \le \beta \le p \quad (7)$$

$$\frac{3\pi}{5p} \le \mu \le \frac{\pi}{p} \quad (8)$$

$$\frac{1}{2} \le \gamma \le 4 \quad (9)$$

- R: the minimum diameter of the stator core
- $r_0$: the maximum diameter of the rotor
- p: the number of poles of the rotor
- θ: an angle [rad] with respect to a straight line (0 [rad]) that extends from the rotation center of the rotor to the center of the pole of the rotor orthogonally to a rotation axis
- φ: a specified range [rad] of r(θ)
- α, β, γ, and μ: parameters each having a range specified by the equations (6)-(9)

wherein $\mu^0 = 1$.

2. The motor according to claim 1, wherein in a cogging torque per rotation of the rotor, the amplitude of the cogging torque of a frequency component at a frequency of the least common multiple of a rotor pole number and a stator teeth number is 0.2% or less of a rated torque.

3. The motor according to claim 1, wherein in a cogging torque per rotation of the rotor, the amplitude of the cogging torque of a frequency component at a frequency of the least common multiple of a rotor pole number and a stator teeth number is 0.125% or less of a rated torque.

4. The motor according to claim 1, wherein the shape of the rotor, the shape of the teeth of the stator, and the phase relationship between the rotor and the teeth are invariant in an axial direction, and the plurality of magnetic poles of the rotor have the same shape.

5. The motor according to claim 1, wherein the parameter φ is determined so as to satisfy the following equation (5'), instead of the equation (5)

$$\frac{4\pi}{5p} \le \phi \le \frac{\pi}{p}. \quad (5')$$

6. The motor according to claim 1, wherein the parameter α is determined so as to satisfy the following equation (6'), instead of the equation (6)

$$\frac{1}{2} \le \alpha \le \frac{3}{2}. \quad (6')$$

7. The motor according to claim 1, wherein the parameter γ is determined so as to satisfy the following equation (9'), instead of the equation (9)

$$\frac{1}{2} \le \gamma \le 2. \quad (9')$$

8. The motor according to claim 1, wherein the parameter β is determined so as to satisfy the following equation (7'), instead of the equation (7)

$$\frac{p}{4} \le \beta \le \frac{p}{2}. \quad (7')$$

9. The motor according to claim 1, wherein the parameter φ, is determined so as to satisfy the following equation (5"), instead of the equation (5)

$$\frac{9\pi}{10p} \le \phi \le \frac{\pi}{p}. \quad (5'')$$

10. The motor according to claim 1, wherein the parameter α is determined so as to satisfy the following equation (6"), instead of the equation (6)

$$\alpha = 1 \quad (6'').$$

11. The motor according to claim 1, wherein the parameter γ is determined so as to satisfy the following equation (9"), instead of the equation (9)

$$\gamma = 1 \quad (9'').$$

12. The motor according to claim 1, wherein the distance r(θ) is determined so as to satisfy the following equation (1'), instead of the equation (1)

$$\int_{-\phi}^{\phi} |f(\theta)^2 - r(\theta)^2| d\theta \le \frac{\phi(R^2 - r_0^2)}{20}. \quad (1')$$

13. The motor according to claim 1, wherein the distance r(θ) is determined so as to satisfy the following equation (2'), instead of the equation (2)

$$\int_{-\phi}^{\phi} |r_1(\theta)^2 - r(\theta)^2| d\theta \ge \frac{\phi(R^2 - r_0^2)}{50}. \quad (2')$$

14. The motor according to claim 1, wherein the distance r(θ) is determined so as to satisfy the following equation (2"), instead of the equation (2)

$$\int_{-\phi}^{\phi} |r_1(\theta)^2 - r(\theta)^2| d\theta \ge \frac{\phi(R^2 - r_0^2)}{20}. \quad (2'')$$

15. The motor according to claim 1, wherein the distance r(θ) is determined so as to satisfy the following equations (10) and (20), instead of the equations (1) and (2)

$$\int_{-\phi}^{\phi} |f(\theta)^2 - r(\theta)^2| d\theta \leq \frac{\phi(R^2 - r_0^2)}{20} \quad (10)$$

$$\int_{-\phi}^{\phi} |r_1(\theta)^2 - r(\theta)^2| d\theta \geq \frac{\phi(R^2 - r_0^2)}{20}. \quad (20)$$

* * * * *